United States Patent [19]

Konen

[11] 4,320,206

[45] Mar. 16, 1982

[54] EMULSION REGENERANT FOR ION EXCHANGE RESINS

[75] Inventor: John C. Konen, Walnut Creek, Calif.

[73] Assignee: Rohm and Haas Company, Philadelphia, Pa.

[21] Appl. No.: 196,520

[22] Filed: Oct. 14, 1980

[51] Int. Cl.$^3$ .............................................. B01J 49/00
[52] U.S. Cl. ..................................................... 521/26
[58] Field of Search ........................................... 521/26

[56] References Cited

U.S. PATENT DOCUMENTS 3,313,726  4/1967  Campbell .............................. 521/26
3,808,158  4/1974  Balto .................................... 521/26
4,191,812  3/1980  Chong .................................. 521/26

Primary Examiner—Joseph L. Schofer
Assistant Examiner—Peter F. Kulkosky
Attorney, Agent, or Firm—John E. Taylor, III

[57] ABSTRACT

Ion exchangers in which both cation and anion exchange groups are present may be regenerated by treating the ion exchanger with a regenerant for one type of ion exchange group, either anion or cation, and subsequently treating the ion exchanger with an ion exchange emulsion bearing the desired ions to regenerate the other type of ion exchange group.

10 Claims, No Drawings

EMULSION REGENERANT FOR ION EXCHANGE RESINS

This invention relates to, and has as its object, the regeneration of ion exchange resins containing both anion and cation functional groups. More preferably it relates to, and has as an object, the regeneration of ion exchange resins in which cation and anion exchange functional groups are both exposed to regenerants for both types of functional groups. At least one of the regenerants permitting this object to be accomplished is an ion exchange resin emulsion.

Ion exchange resin beds containing both cation and anion functional groups are commonly employed to treat liquids containing both undesirable cations and undesirable anions. Such beds may contain both cation and anion exchange resins, either mixed together or stratified one above the other, or they may contain amphoteric resins in which both cationic and anionic exchange sites are present in the same resin particle. Mixed beds contain particles of cation exchange resins mixed with particles of anion exchange resins; the cation exchange resins may be strongly acidic or weakly acidic or both, and the anion exchange resins may be strongly basic or weakly basic or both.

If conventional, single-resin regeneration techniques, i.e., treating the exhausted anion resins with a base or a salt containing a desirable anion, or the exhausted cation resins with an acid or a salt containing a desirable cation, are employed with mixed resin beds or beds containing mixed anion and cation exchange groups, the cation component of the anion group regenerant contaminates the cation groups, and the anion component of the cation regenerant contaminates the anion groups: one type of group is regenerated and the other type is simultaneously exhausted by each regenerant (the term "type" as applied herein to ion exchange groups or resins means the exchangeable ion type, either cation or anion).

Several approaches are used to avoid this problem. A very common approach with mixed bed resins is to separate the cation resins from the anion resins prior to regeneration. This is often done by hydraulic classification, i.e., by passing a liquid upward through the mixed resin bed. For this technique to be effective, the two types of resins must have been carefully selected for density and particle size, so that the anion resins settle in the liquid at a different rate from the cation resins. This difference in settling rate allows one type of resin to settle to the bottom of the vessel, and the other type to settle above the first. Sometimes an inert separator material is included with the mixed resins, as described in U.S. Pat. No. 4,151,332; this material has a settling rate intermediate to that of the two resin types. Thus, during the hydraulic classification the separator material settles between the two resin types to provide physical separation of them. Once classified, the anion resins and cation resins may be separately removed from the vessel for regeneration, or they may be regenerated in situ by introducing and removing the regenerants such that each flows only through the type of resin for which it is meant. For example, if the cation resin settles to the bottom of the vessel, the cation regenerant may be introduced at the interface between the resin types and removed at the bottom of the vessel, or it may be introduced at the bottom and removed at the interface. Similarly, the anion regenerant may be introduced at the interface and removed at the top of the vessel, or introduced at the top and removed at the interface.

Such a regeneration process requires time for the classification step, extra piping for introduction or removal of regenerants at the interface, and a remixing step prior to the next cycle of liquid treatment. Through resin swelling or attrition the position of the interface may move, and there is always a zone near the interface which is contacted by both regenerants. Whether this zone is filled with an inert separator material or with one or the other type of resin, it represents a part of the total bed volume in which no useful ion exchange can occur.

The process of the present invention provides a technique by which a mixed resin bed may be regenerated without first separating the two types of resins. At least one of the regenerants used is an ion exchange emulsion such as those described in U.S. Pat. No. 4,191,812, which is hereby incorporated herein by reference. As explained therein, ion exchange emulsions behave much like ion exchange liquids when in contact with conventional ion exchange particles.

It has now been discovered that treating exhausted ion exchange functional groups of one type, in the presence of regenerated ion exchange functional groups of the other type, with an ion exchange emulsion bearing the desired regenerating ions for the one ion exchange type will regenerate that one ion exchange type without exhausting or significantly exchanging ions with the regenerated ion exchange groups of the other type. Consequently a bed of resins bearing exhausted, mixed types of ion exchange groups may be regenerated by passing through the entire bed a regenerant for one type of ion exchange group, either a conventional regenerant or an ion exchange emulsion bearing the desired ions to regenerate the one type of ion exchange group, and subsequently passing through it an ion exchange emulsion bearing the desired ions to regenerate the other type of ion exchange group.

The resins which may be regenerated using the process of the present invention include mixtures of cation exchange resins, either strongly or weakly acidic or both, with anion exchange resins, either strongly or weakly basic or both. While the greatest benefit from the process obtains from its use with conventional ion exchange resin beds of mixed resins, it may also be applied to "batch" regenerations wherein the resins are agitated with the two consecutive regenerants as described above, the first regenerant being removed from the resins prior to the introduction of the second, and any desired number of washes being conducted prior to, between, and subsequent to the regenerant treatments. The process may also be applied to other than mixed bed resins. For example, when two types of resins are stratified in an ion exchange bed, the necessity of introducing or removing regenerants at the interface between the two resin types may be eliminated by using the present process, simply by introducing the two regenerants consecutively to the entire bed, either upflow or downflow, to regenerate the two types of resins. Other resins to which the present regeneration process is applicable include amphoteric resins such as the hybrid resins (e.g., see U.S. Pat. No. 3,991,017), in which both cationic and anionic exchange sites are present in the same resin particle. It should be noted that, while thermal regeneration using heated water is a conventional regeneration process for weak-acid/weak-base amphoteric resins, no practical method for regenerating strong-acid/strong-base amphoteric resins has been available prior to discovery of the process of the present invention.

It will be understood by those skilled in the art that the term "exhaustion" as used herein refers to an at least partial exchange of desirable ions from the ion exchange resin, these ions being replaced at the ion exchange sites on the resin by less desirable ions from the liquid being treated. The degree of exhaustion reached before regeneration is desirable may vary widely among specific situations, and may readily be selected for a specific situation by one skilled in the art. Similarly, the term "regeneration" as used herein refers to an exchange of the less desirable ions from the ion exchange sites of the resin, these ions being replaced at the resin exchange sites by desirable ions from the regenerant. The degree of regeneration also varies widely according to the situation. Thus, a "regenerated" resin has been restored to the desired ionic form to a degree satisfactory for the particular application, and is seldom, if ever, converted entirely to the desired ionic form. The term "form" as herein applied to ion exchange resins refers to the particular ionic species; thus, one speaks of a resin of the cation type in the hydrogen form or the sodium form, or a resin of the anion type in the hydroxyl form or the chloride form.

The following examples serve to illustrate the present invention; they are not intended to limit it except as it is limited in the claims. All percentages are by weight unless otherwise specified, and all reagents mentioned are of good commercial quality unless otherwise specified.

EXAMPLE 1

This example illustrates the regeneration of mixed cation and anion exchange resins according to the process of the present invention using hydrochloric acid cation regenerant and a strongly basic anion exchange resin emulsion in the hydroxyl form as the anion regenerant.

The conventional resins regenerated in this example by the process of the present invention are a strongly basic anion exchange resin prepared from a styrene-3% divinylbenzene polymer and containing quaternary ammonium anion exchange groups, and a strongly acidic cation exchange resin prepared from a styrene-8% divinylbenzene polymer and containing sulfonic acid cation exchange groups. The average diameter of these ion exchange resin beads is about 0.4–0.5 mm, and they are mixed in a volume ratio of 1 part cation exchange resin to 1.5 parts anion exchange resin. Prior to initial exhaustion the anion and cation exchange resins had been separately regenerated to the hydroxyl and hydrogen forms with a large excess of sodium hydroxide and sulfuric acid, respectively.

The mixed, regenerated resins were packed into a 1-inch (i.d.) glass column to a bed depth of 24 inches with a total of 265 ml of the resins. The resins were exhausted by passing through the bed an aqueous solution of sodium chloride at the concentrations and flow rates shown in Table I, below, until the resistivity of the effluent dropped to 20,000 ohm-cm, at which resistivity the sodium chloride solution was stopped. The bed was then rinsed by passing deionized water through it in a downflow direction. The cation exchange resin was regenerated by passing aqueous 10% hydrochloric acid solution in a downflow direction through the bed at a rate of 0.5 gpm/ft$^3$ until the number of milliequivalents of HCl per milliequivalent of resin indicated in Table I, below, had passed through the bed; this was equivalent to a regeneration level, in pounds of regenerant per cubic foot of resin (lbs/ft$^3$), also indicated in Table I below. The bed was rinsed with deionized water, and the anion exchange resin was regenerated by passing through the column, in a downflow direction at a rate of 0.25 gpm/ft$^3$, an emulsion of strongly basic anion exchange resin in the hydroxyl form until the number of milliequivalents of regenerant emulsion per milliequivalent of exhausted anion resin shown in Table I, below, had passed through the bed. The anion exchange resin emulsion contained 10% solids of an emulsion polymer of styrene-1.8% divinylbenzene functionalized as described in the above-incorporated U.S. Pat. No. 4,191,812 with quaternary ammonium ion exchange groups, and contained 0.34 meq of exchangeable hydroxyl ion per gram of emulsion. The number of milliequivalents of exhausted anion resin used in the above ratio was the number of milliequivalents of sodium chloride required to reach the 20,000 ohm-cm resistivity for the initial exhaustion of the separately regenerated resins; this value was used in each of the subsequent ratios. Following the emulsion regenerant the bed was rinsed with the indicated volume of deionized water (Table I, below), to an effluent that was crystal clear and free of alkalinity. This process was repeated for the five subsequent exhaustion-regeneration cycles as shown in Table I below.

TABLE I

| Regeneration of Mixed Resins with Conventional Cation Regenerant and Emulsion Anion Regenerant | | | | | | |
|---|---|---|---|---|---|---|
| Run | 1 | 2 | 3 | 4 | 5 | 6 |
| Bed Volume (ml) | 265 | 265 | 265 | 265 | 265 | 265 |
| Exhaustant (ppmNaCl) | 520 | 525 | 520 | 515 | 524 | 524 |
| Flow Rate (gpm/ft$^3$) | 2 | 2 | 2 | 2 | 2 | 2 |
| Peak Resistance (megohms-cm) | 16 | 4.8 | 6.0 | 4.4 | 12.9 | 14.5 |
| Percent Effluent > 10 megohms-cm | 65 | 0 | 0 | 0 | 54 | 61 |
| Column Capacity for NaCl | | | | | | |
| as KgrCaCO$_3$/ft$^3$ | 14.3 | 12.0 | 13.7 | 11.2 | 14.48 | 14.22 |
| as Total meqNaCl | 174 | 146 | 166 | 136 | 176 | 172 |
| End Point (megohm-cm) | 0.02 | 0.02 | 0.02 | 0.02 | 0.02 | 0.02 |
| Regeneration | | | | | | |
| HCl (meq H$^+$/meq Resin) | — | 2.90 | 4.35 | 4.35 | 17.5 | 17.5 |
| (lb. HCl/ft$^3$ Resin) | — | 10 | 15 | 15 | 25 | 25 |
| Anion Emulsion (meq/meq Resin) | — | 1.5 | 2.0 | 1.0 | 3.0 | 3.0 |
| Rinse (bed volumes) | — | 3 | 3 | 3 | 3 | 3 |
| NaOH (10%) | Large Excess | — | — | — | — | — |
| H$_2$SO$_4$ (10%) | Large | — | — | — | — | — |

TABLE I-continued

| | Regeneration of Mixed Resins with Conventional Cation Regenerant and Emulsion Anion Regenerant | | | | | |
|---|---|---|---|---|---|---|
| Run | 1 | 2 | 3 | 4 | 5 | 6 |
| | Excess | | | | | |

EXAMPLE 2

This example illustrates the regeneration of mixed cation and anion exchange resins according to the process of the present invention using a strongly acidic cation exchange resin emulsion in the hydrogen form as the cation regenerant, and a strongly basic anion exchange resin emulsion in the hydroxyl form as the anion regenerant.

The mixed, separately and freshly regenerated, conventional ion exchange resin beads used were as described in Example 1; these were packed into a 2-inch (i.d.) glass column to a bed depth of 24 inches with 1168 ml of the resins. The resins were exhausted by passing through the bed an aqueous solution of sodium chloride at the concentrations and flow rates shown in Table II, below, until the resistivity of the effluent dropped to 1 megohm-cm, at which resistivity the sodium chloride solution was stopped.

The exhausted resin was subjected to two conventional regeneration-exhaustion cycles in which the exhausted resin was rinsed and simultaneously classified with a backflow wash of deionized water, the anion exchange resin was removed from the column and regenerated to a 12.7 lb/ft$^3$ level with aqueous 4% sodium hydroxide solution, and the cation exchange resin was regenerated to a 9.1 lb/ft$^3$ level with aqueous 10% sulfuric acid solution. Both resins were rinsed with deionized water, returned to the 2-inch column, nitrogen mixed, and allowed to settle prior to being exhausted again as described above.

Subsequently the resins were subjected to two regeneration-exhaustion cycles and a third regeneration, each according to the process of the present invention, using emulsion ion exchange resins for both the cationic and anionic regeneration. For each of these regenerations the undisturbed bed of mixed, exhausted resins was rinsed with deionized water and the cation resin was regenerated by passing through the column, in a down-flow direction at a rate of 0.25 gpm/ft$^3$, an emulsion of strongly acidic cation exchange resin in the hydrogen form until the number of milliequivalents of regenerant emulsion per milliequivalent of exhausted cation resin shown in Table II, below, had passed through the bed. The cation exchange resin emulsion contained 7.2% solids of an emulsion polymer of styrene-7% divinylbenzene functionalized as described in the above-incorporated U.S. Pat. No. 4,191,812 with sulfonic acid cation exchange groups, and contained 0.29 meq of exchangeable hydrogen ion per gram of emulsion. The resin bed was rinsed with about 20 bed volumes of deionized water, at which point the effluent was still slightly turbid. The anion exchange resin was then regenerated using the anion exchange emulsion in the hydroxyl form, as described in Example 1. The results of the two conventional regenerations and three regenerations according to the present invention are given in Table II, below.

TABLE II

| | Regeneration of Mixed Resins with Emulsion Anion and Cation Regenerants | | | | |
|---|---|---|---|---|---|
| Run | 1 | 2 | 3 | 4 | 5 |
| Bed Volume (ml) | 1168 | 1168 | 1168 | 1168 | 1168 |
| Exhaustant (ppmNaCl) | 495 | 495 | 495 | 510 | 510 |
| Flow Rate (gpm/ft$^3$) | 2 | 2 | 2 | 2 | 2 |
| Peak Resistance (megohm-cm) | 21.7 | 20.5 | 21.4 | 20.0 | 19.7 |
| Percent Effluent >10 megohm-cm | 86 | 83 | 85 | 85 | 92 |
| Column Capacity | | | | | |
| (as Kgr CaCO$_3$/ft$^3$) | 13.3 | 8.7 | 8.7 | 10.7 | 5.8 |
| (as total meq NaCl) | 711 | 465 | 465 | 572 | 310 |
| End Point (megohm-cm) | 1.0 | 1.0 | 1.0 | 1.0 | 1.0 |
| Regeneration | | | | | |
| Anion (meq Emulsion/meq Resin) | — | — | — | 3 | 3 |
| Cation (meq Emulsion/meq Resin) | — | — | — | 1.6 | 3 |
| NaOH (meq Regenerant/meq Resin) | Large Excess | 4.79 | 4.79 | | |
| H$_2$SO$_4$ (meq Regenerant/meq Resin) | Large Excess | 1.92 | 1.92 | | |

NOTE:
During Run 5 blockage occurred resulting in channelling of the cation emulsion regenerant.

I claim:

1. A process for regenerating at least partially exhausted ion exchange materials containing both anion and cation types of ion exchange functional groups, the process comprising the consecutive steps of
   (a) treating the materials with a first regenerant to regenerate one of the types of ion exchange functional groups to the desired ionic form,
   (b) separating the first regenerant from the materials,
   (c) treating the materials with a second regenerant comprising an ion exchange resin emulsion in an ionic form suitable for regenerating the other type of ion exchange functional groups, to regenerate the other type of ion exchange functional groups to the desired ionic form, and
   (d) separating the second regenerant from the materials.

2. The process of claim 1 wherein the first regenerant is a conventional ion exchange regenerant solution.

3. The process of claim 1 wherein the first regenerant is an ion exchange resin emulsion in an ionic form suitable for regenerating the first type of resin.

4. The process of claim 1 wherein the ion exchange materials are particles of amphoteric ion exchange resin.

5. The process of claim 4 wherein the anion exchange groups are strongly basic and the cation exchange groups are strongly acidic.

6. The process of claim 4 wherein the anion exchange groups are weakly basic and the cation exchange groups are weakly acidic.

7. The process of claim 1 wherein the ion exchange materials are in the form of a bed.

8. The process of claim 1 wherein the ion exchange materials comprise particles bearing essentially the first type of ion exchange functional groups and particles bearing essentially the second type of ion exchange functional groups.

9. The process of claim 8 wherein the particles bearing the first type of ion exchange functional groups are separate from the particles bearing the second type of ion exchange functional groups.

10. The process of claim 8 wherein the particles bearing the different types of ion exchange functional groups are mixed together.

* * * * *